United States Patent [19]

Miyama et al.

[11] Patent Number: 4,976,139

[45] Date of Patent: Dec. 11, 1990

[54] TROUBLE DETECTOR SYSTEM FOR AN INTAKE SYSTEM OF AN AUTOMOTIVE ENGINE

[75] Inventors: Shuji Miyama; Hiroya Ohkumo, both of Kaisha, Japan

[73] Assignee: Fuji Jukogyo Kabushiki Kaisha, Tokyo, Japan

[21] Appl. No.: 477,194

[22] Filed: Feb. 6, 1990

Related U.S. Application Data

[63] Continuation of Ser. No. 300,109, Jan. 18, 1989, abandoned.

[30] Foreign Application Priority Data

Feb. 16, 1988 [JP] Japan ................................ 63-033194

[51] Int. Cl.[5] ............................................. G01M 15/00

[52] U.S. Cl. .................................... 73/117.3; 123/193

[58] Field of Search ........................ 73/117.3; 123/493; 364/431.05; 340/52 R

[56] References Cited

U.S. PATENT DOCUMENTS 4,736,626 4/1988 Mizuno et al. ...................... 73/117.3

4,759,332 7/1988 Morozumi ........................... 123/489

FOREIGN PATENT DOCUMENTS 58-214632 12/1983 Japan .

0200032 11/1984 Japan .................................. 123/493

*Primary Examiner*—Robert R. Raevis

*Attorney, Agent, or Firm*—Martin A. Farber

[57] ABSTRACT

A plurality of reference pressures for pressures in an intake passage of the engine are stored in a memory so as to be derived in accordance with speed of the engine and opening degree of a throttle valve of the engine. A reference pressure is derived from the memory in accordance with the engine speed and the corrected opening degree. The reference pressure is delayed. Pressure in an intake pipe is compared with the delayed reference pressure. An abnormality signal is generated when the intake pipe pressure is higher than the delayed reference pressure.

3 Claims, 6 Drawing Sheets

TROUBLE DETECTOR SYSTEM FOR AN INTAKE SYSTEM OF AN AUTOMOTIVE ENGINE

RELATED APPLICATION

This application is a continuation of our co-pending application Serial No. 07/300,109 filed Jan. 18, 1989 now abandoned.

BACKGROUND OF THE INVENTION

The present invention relates to a system for detecting trouble of an intake system of an automotive engine.

A fuel injection system in which a basic fuel injection quantity is determined in accordance with pressure in an intake pipe and speed of the engine is used for automobiles. In such a system, if a trouble of the intake pipe occurs, such as the coming out of a blind cap on the intake system downstream of a throttle valve which is caused by backfiring, air is induced in the intake pipe passing through a hole for the blind cap without passing the throttle valve. The pressure in the intake pipe rises with the induced air. As a result, the fuel injection system operates to increase the basic fuel injection quantity in accordance with the high intake pipe pressure, which causes an abnormal increase of the speed of the engine regardless of driver's intention.

Japanese Pat. application Laid-Open 58-214632 discloses a system for solving such a problem. The system stores reference data of intake pipe pressure determined by the opening degree of the throttle valve and the engine speed. Detected intake pipe pressure is compared with a stored reference pressure. If the detected pressure is higher than the reference pressure, the basic fuel injection quantity is fixed to a predetermined value, thereby preventing an abnormal increase of the engine speed.

However, at an engine transient state, such as when a depressed accelerator pedal is quickly released, although the reference pressure immediately decreases as a result in the large decreases of throttle opening degree and engine speed, the actual pressure slowly decreases because of the capacity of the intake passage. Consequently, as shown in FIG. 4, the actual pressure becomes higher than the reference pressure, so that abnormality in the intake system is erroneously determined.

SUMMARY OF THE INVENTION

The object of the present invention is to provide a system which may solve the above described problems in a conventional fuel injection system.

In the system of the present invention, the reference pressure is prevented from becoming higher than the actual pressure by delaying the reference pressure.

According to the present invention, there is provided a system for detecting trouble of an intake system of an engine having a throttle valve, comprising a pressure sensor for detecting pressure in an intake passage of the engine, an engine speed detector for detecting the speed of the engine, a throttle position sensor for detecting the opening degree of the throttle valve, a memory storing a plurality of reference values for a parameter selected from the pressure in an intake passage of the engine, the opening degree of the throttle valve and the engine speed, which are arranged to be derived in accordance with a parameter other than the selected parameter, means for deriving a reference value from the memory in accordance with the non-selected detected parameters, detector means for a detecting transient state of the engine and for producing a transient signal, delay means responsive to the transient signal for delaying the derived reference value, comparator means for comparing a value detected by the sensor for the selected parameter with the delayed reference value, and for producing an abnormality signal when the detected value is higher than the delayed reference value.

In an aspect of the invention, the selected parameter is the pressure in the intake passage.

The other objects and features of this invention will become understood from the following description with reference to the accompanying drawings.

DETAILED DESCRIPTION OF THE PREFERRED EMBODIMENTS

Figure 1:
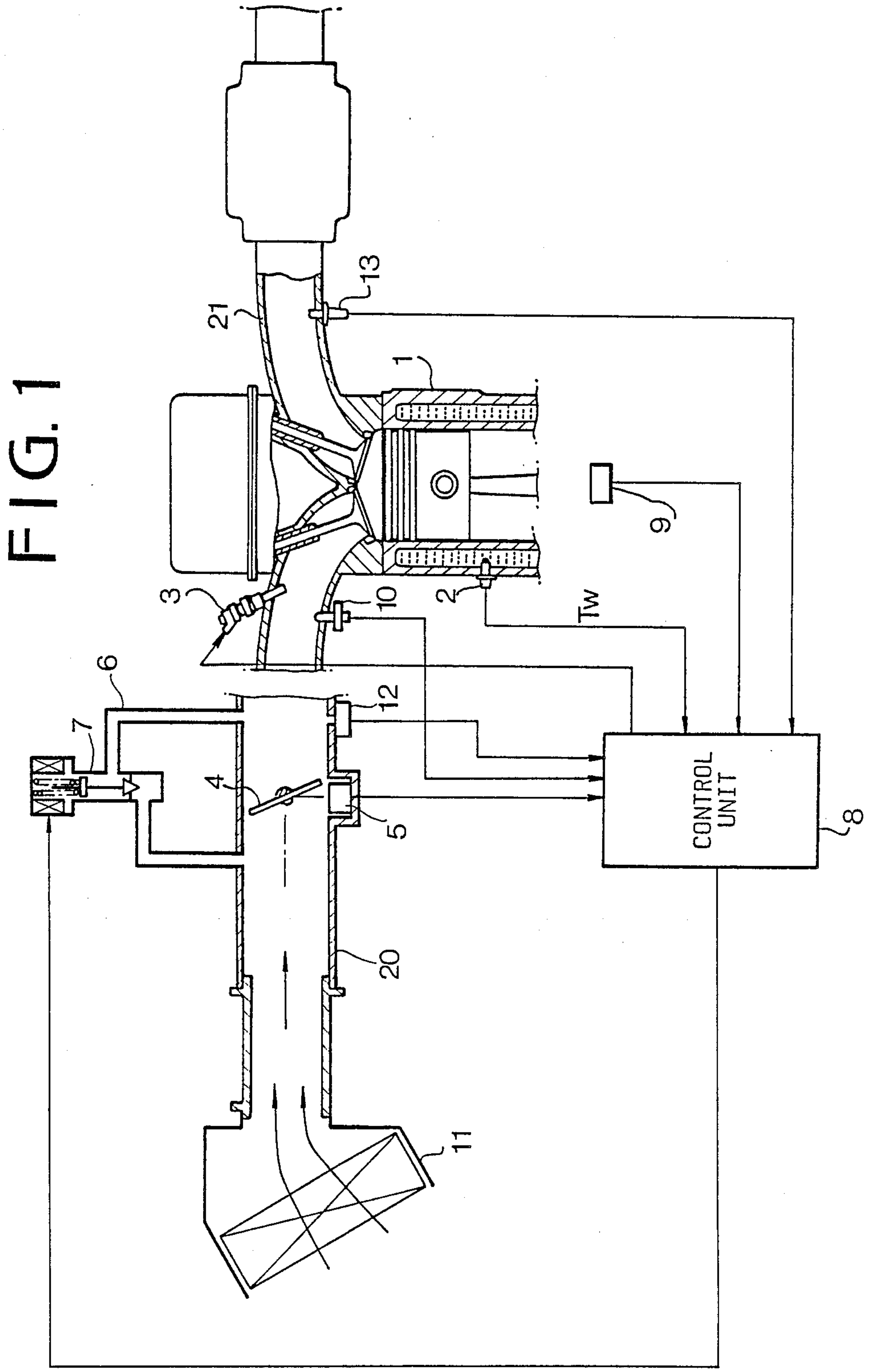
FIG. 1 is a schematic diagram showing a system according to the present invention.

Referring to FIG. 1, an automotive engine 1 is provided with a coolant temperature sensor 2 on a water jacket thereof, a fuel injector 3, and a throttle position sensor 5 for detecting the opening degree of a throttle valve 4 in an intake pipe 20. A bypass 6 provided with an idle speed control (ISC) valve 7 is provided around the throttle valve 4. Further, there are provided a crankangle sensor 9 as an engine speed sensor, an air cleaner 11, intake air temperature sensor 10, pressure sensor 12 for detecting pressure in the intake pipe 20 downstream of the throttle valve 4, and an $0_2$-sensor 13 for detecting oxygen concentration of the exhaust gas in an exhaust pipe 21. Output signals of those sensors are fed to a control unit 8 which produces signals for operating the fuel injector 3, and ISC valve 7.

Figure 2:
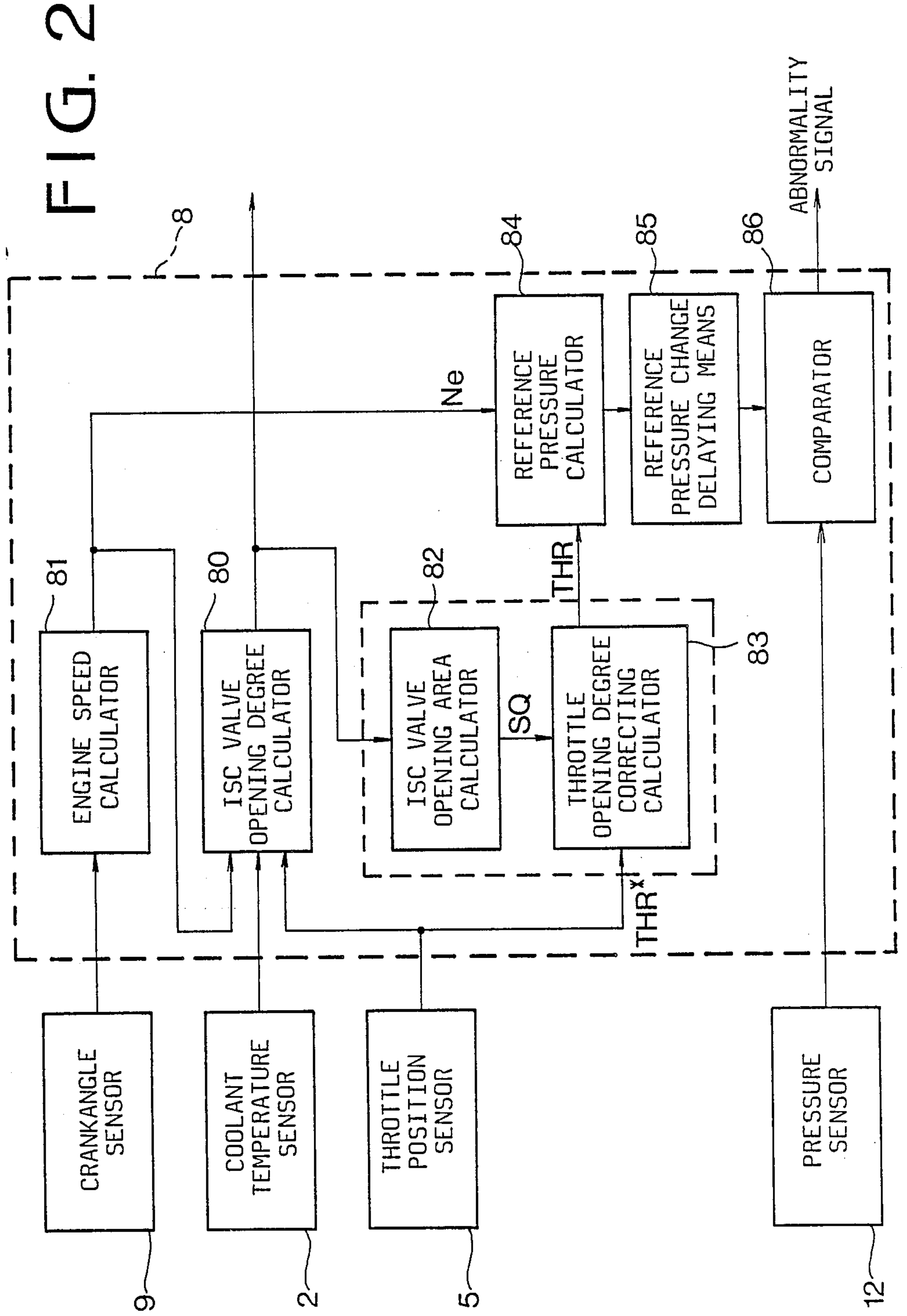
FIG. 2 is a block diagram of a control unit.

Referring to FIG. 2, an engine speed calculator 81 is supplied with the output signal of the crankangle sensor 9 to produce an engine speed signal. Output signals of the coolant temperature sensor 2, throttle position sensor 5, and engine speed calculator 81 are fed to an ISC valve opening degree calculator 80. The output signal of the calculator 80 is applied to the ISC valve 7 to provide a proper opening degree of the throttle valve 14. The output signal is also applied to an ISC valve opening area calculator 82 where the area SQ of an opening to be formed is calculated. The opening area SQ and the throttle position THR* from the throttle position sensor 5 are applied to a throttle opening degree correcting calculator 83. The calculator 83 has a table storing corrected throttle opening degrees in accordance with the throttle position THR* and opening area SQ, and derives throttle opening degrees from the table. A corrected throttle opening degree $THR=f(THR^*, SQ)$ is calculated with an interpolation calculation based on the derived throttle opening degrees when the ISC valve is opened at idling, thereby increasing the amount of intake air.

Figure 6:
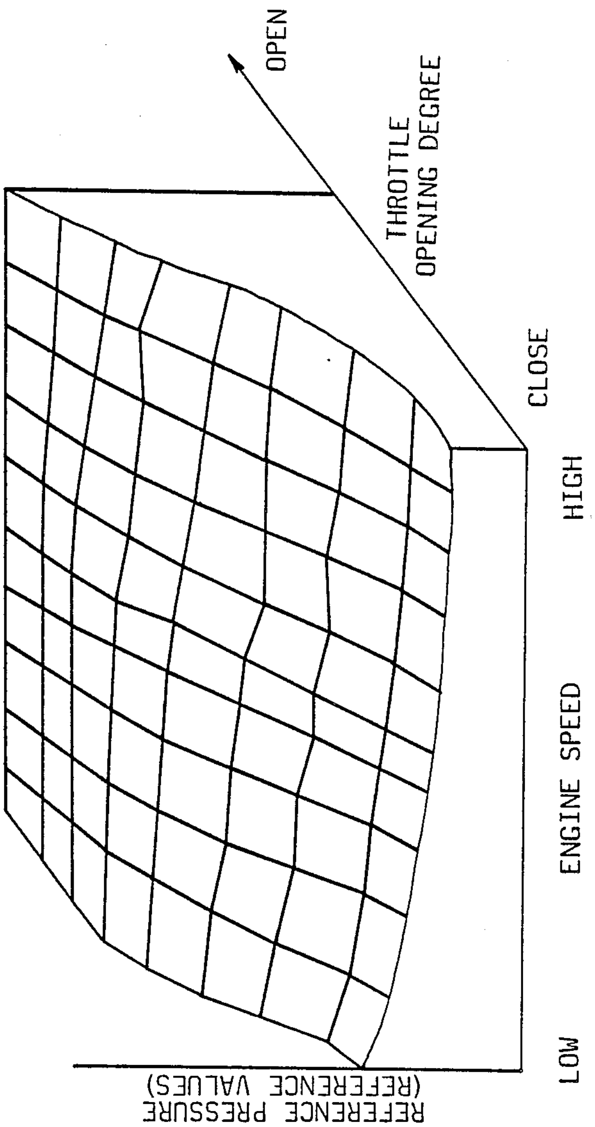
FIG. 6 is a perspective view schematically showing a three-dimensional table.

The output signal Ne of the engine speed calculator 81 and the corrected throttle opening degree THR are sent to a reference pressure calculator 84. The calculator 84 has a three-dimensional table storing reference values of reference intake pipe pressure in accordance with engine speed Ne and corrected throttle opening degree THR, as shown in FIG. 6. In accordance with the engine speed Ne and corrected throttle opening degree THR, reference pressures (reference values) are derived from the table. Further, a reference pressure PMR for the pressure in the intake pipe is calculated by an interpolation calculation based on the derived reference pressures $PMR=f(Ne, THR)$. The reference pressure PMR is applied to a reference pressure change delaying means 85 so as to slow the reduction speed of the reference pressure. In the delaying means 85, the current reference pressure PMR' is compared with a reference pressure $PMR_{old}$ obtained at the last cycle of the program. When the reference pressure PMR had decreased, ($PMR' < PMR_{old}$), it is determined that the engine operation is in a transient state. In accordance with the determination, the derived reference pressure is increased by a proper increment, thereby slowing the decrease speed of the reference pressure from $PMR_{old}$ to the derived PMR'. For example, a corrected PMR is $$PMR \leftarrow (PMR' + 3PMR_{old})/4$$

The actual pressure PM detected by the pressure sensor 12 is compared with the corrected reference pressure PMR at a comparator 86. If the corrected reference pressure PMR is higher than the pressure PM in the intake pipe, the intake system is in a normal state. If the pressure PM is higher than the reference pressure PMR, it is determined that some trouble arose in the intake system. The comparator produces a fail-safe signal to maintain a normal operation of the engine accordingly.

Figure 3:
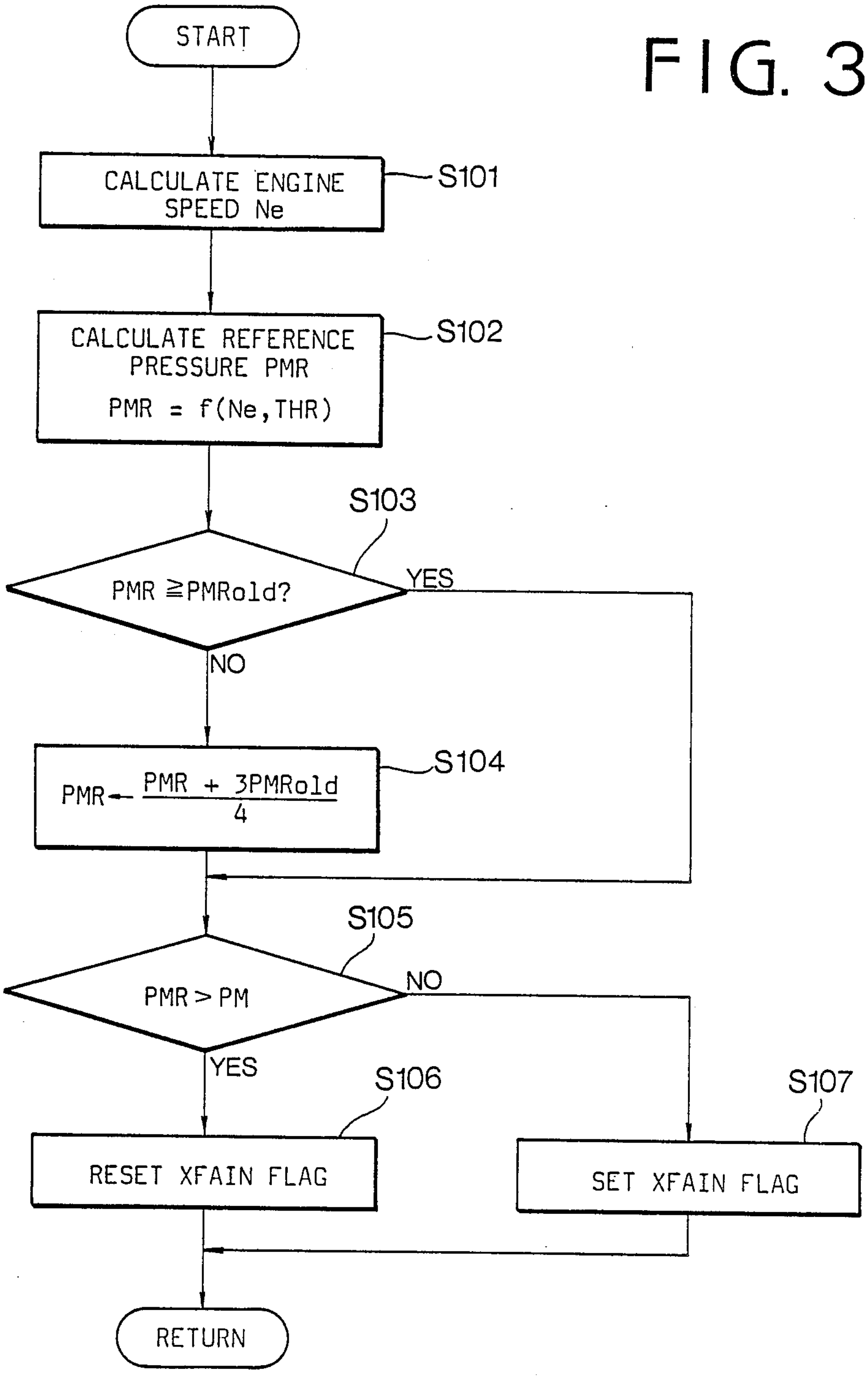
FIG. 3 is a flowchart of the operation of the control unit.
Figure 4:
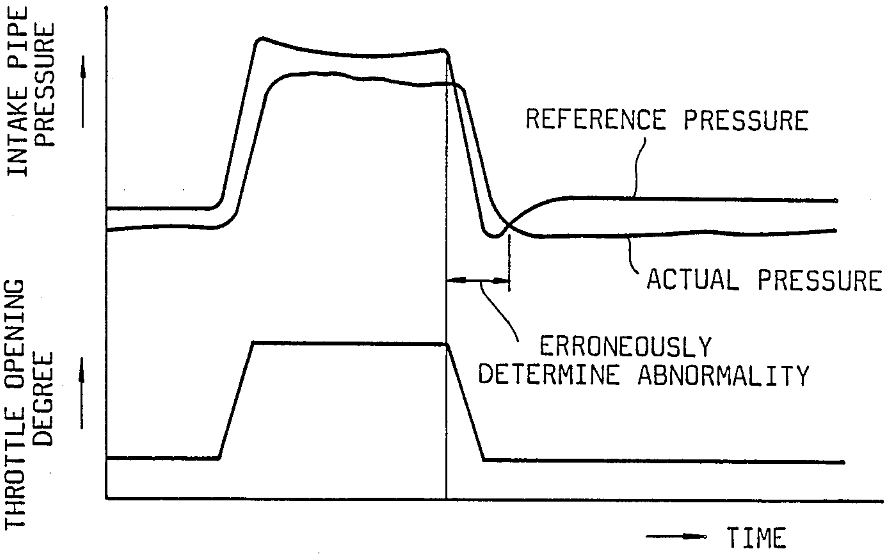
FIG. 4 (PRIOR ART)
FIGS. 4 and 5 are graphs showing variations of reference pressure and actual pressure in an intake pipe in accordance with throttle opening degree in the system of the prior art and the system of the present invention, respectively.

The operation of the system is described hereinafter with reference to FIG. 3. Engine speed Ne, and the current reference pressure PMR' are obtained at steps S101 and S102, respectively. At a step S103, it is determined whether the current reference pressure PMR' is higher than the last reference pressure $PMR_{old}$($PMR' \geqq PMR_{old}$). When the current reference pressure PMR' is lower, the corrected reference pressure is calculated in dependency on $PMR \leftarrow PMR' + 3PMR_{old})/4$. When the current reference pressure is higher, the program proceeds directly to a step S105. At the step S105, it is determined whether the actual pressure PM is higher than the corrected reference pressure PMR or not. If $PMR > PM$, the program proceeds to a step S106 where abnormal flag XFAIN is reset. If $PMR < PM$, abnormal flag XFAIN is set at step S107, whereby a fail-safe signal such as a fuel cut off signal is generated.

Figure 5:
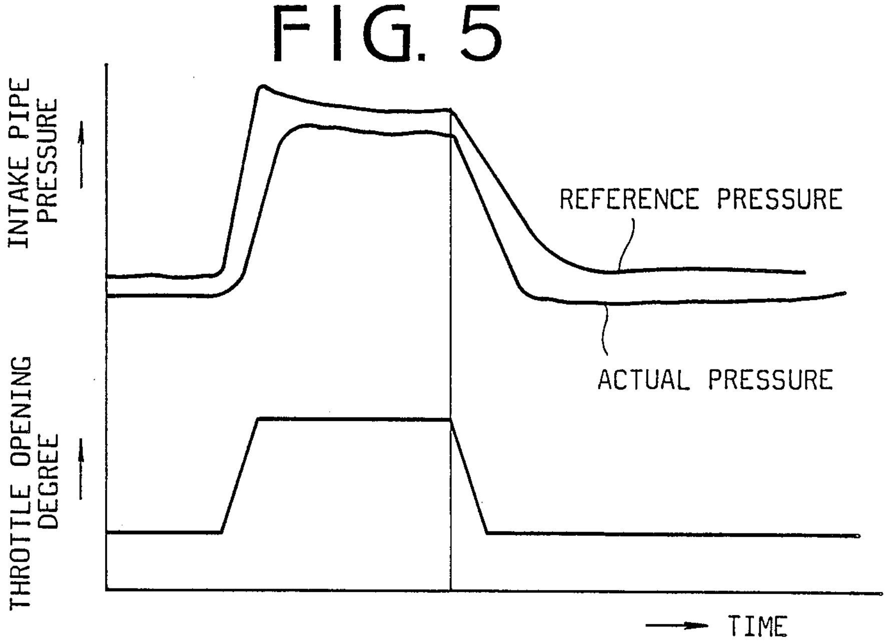

In accordance with the present invention, as shown in FIG. 5, when the accelerator pedal is quickly released, the reference pressure is slowly decreased without becoming lower than the actual pressure. Thus, the system does not erroneously determine the abnormality in the intake system.

Figure 7:
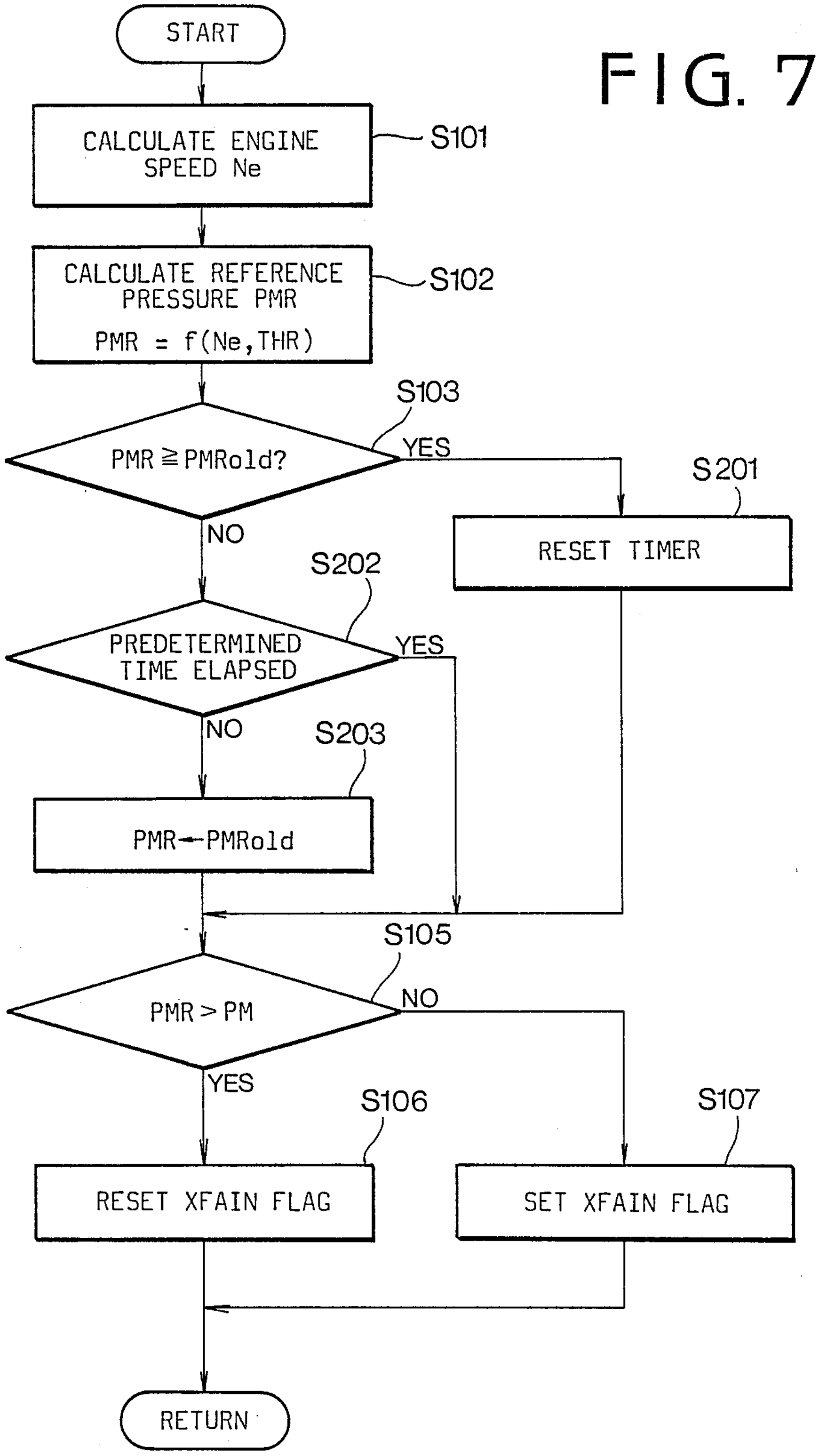
FIG. 7 is a flowchart of the operation of the control unit in a modification of the present invention.

FIG. 7 shows the operation of a system of a modification of the present invention where the change of the reference pressure to PMR from $PMR_{old}$ is delayed a predetermined period using a timer. When it is determined that the current PMR is higher than the last $PMR_{old}$ at the step S103 of FIG. 7, a timer is reset at a step S201. On the other hand, when it is determined that present PMR is not higher, the timer is set and determined at a step S202 whether a predetermined time elapsed since setting the timer. If the predetermined period has not elapsed, the PMR is set to the previous pressure $PMR_{old}$ at a step S203. The reference pressure is compared with the actual pressure PM at the step S105. When the predetermined time had passed, the program goes directly to the step S105.

The abnormality of the intake system can also be detected through opening degree or engine speed. More particularly, reference throttle opening degrees (as reference values) are stored in a table having an X-axis representing intake pressure and a Y-axis representing engine speed, and an actual throttle opening degree is compared with a derived reference opening degree. If the intake pressure has an abnormally high value, the derived reference opening degree deviates greatly from the actual opening degree.

From the foregoing, it will be understood that the present invention provides a system where change of a reference value dependent on throttle opening degree, engine speed or intake pipe pressure is controlled so that the reference value changes with a delay when the engine is in a transient state. Accordingly, an error in detecting trouble in the intake system can be prevented.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A system for detecting trouble of an intake system of an engine comprising a throttle valve in said intake system for controlling a volume of intake air, an engine speed sensor mounted on said engine for detecting engine speed and for producing an engine speed signal, a pressure sensor mounted on said intake system for detecting pressure of said intake air and for producing a pressure signal, and a throttle position sensor interposed in said intake system for detecting opening degree of said throttle valve and for generating an opening degree signal, the trouble system comprising:

memory means for storing a plurality of reference values of at least one of said engine speed signal, said pressure signal and said throttle opening degree signal as a parameter in a relationship with other signals;

first calculating means responsive to said other signals for calculating said reference values at a predetermined time interval and for producing a present reference value and a previous reference value;

judging means responsive to said present and previous reference values for determining a transient state of said engine and for producing a transient signal;

second calculating means responsive to said transient signal for changing said present reference value to a corrected reference value close to said previous reference value and for delivering said corrected reference value as a delay signal; and a comparator responsive to said one of said signals and said corrected reference value for comparing said one of said signals and said corrected reference value and for producing a judgement signal when said corrected reference value is smaller than said one of said signals so as to indicate said trouble.

2. The system according to claim 1, wherein said parameter is said pressure signal in said intake system.

3. A system for detecting trouble of an intake system of an engine having a throttle valve in said intake system for controlling a volume of intake air, an engine speed for detecting engine and for producing a corresponding engine speed signal, a pressure sensor for detecting a pressure of said intake air and for producing a corresponding pressure signal, and a throttle position sensor for detecting opening degree of said throttle valve and for generating a corresponding opening degree signal, the system comprising:

memory means for storing a plurality of reference pressure values in a relationship with said engine speed and said opening degree;

setting means responsive to said engine speed signal and said opening degree signal for deriving corresponding of said reference values from said memory means at a predetermined time interval for producing a present reference value and a previous reference value;

judging means responsive to said present and previous reference values for determining a transient state of said engine and for producing a transient signal;

calculating means responsive to said transient signal for correcting said present reference value using said previous reference value so as to delay transmission of the present reference value in the transient state by producing and transmitting a corrected reference value; and comparing means responsive to said pressure signal and said corrected reference value for comparing said corrected reference value with said pressure signal in the transient state and for producing an abnormality judgement signal when said pressure signal is higher than said corrected reference value so as to indicate said trouble.

* * * * *